(12) United States Patent
Sun et al.

(10) Patent No.: US 10,899,892 B2
(45) Date of Patent: Jan. 26, 2021

(54) COPOLYMERIZED HIGH TEMPERATURE BONDING COMPONENT

(71) Applicant: Applied Materials, Inc., Santa Clara, CA (US)

(72) Inventors: Jennifer Y. Sun, Mountain View, CA (US); Sumanth Banda, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/724,110

(22) Filed: Dec. 20, 2019

(65) Prior Publication Data
US 2020/0140620 A1 May 7, 2020

Related U.S. Application Data

(62) Division of application No. 15/352,925, filed on Nov. 16, 2016, now Pat. No. 10,570,257.

(60) Provisional application No. 62/255,939, filed on Nov. 16, 2015.

(51) Int. Cl.
| | |
|---|---|
| *C08G 77/442* | (2006.01) |
| *C08F 283/12* | (2006.01) |
| *C08G 77/385* | (2006.01) |
| *C08G 77/50* | (2006.01) |
| *C08J 7/16* | (2006.01) |
| *C08L 27/12* | (2006.01) |

(Continued)

(52) U.S. Cl.
CPC .......... *C08G 77/442* (2013.01); *C08F 283/12* (2013.01); *C08G 77/385* (2013.01); *C08G 77/50* (2013.01); *C08J 7/16* (2013.01); *C08L 27/12* (2013.01); *C08L 83/04* (2013.01); *C09J 127/12* (2013.01); *C08J 2383/04* (2013.01); *C08J 2427/12* (2013.01); *C08L 2205/04* (2013.01)

(58) Field of Classification Search
CPC .... C08G 77/442; C08G 77/385; C08G 77/50; C08F 283/12; C08J 7/16; C08J 2383/04; C08J 2427/12; C08L 27/12; C08L 83/04; C08L 2205/04; C09J 127/12
USPC ....................................................... 427/488
See application file for complete search history.

(56) References Cited

U.S. PATENT DOCUMENTS

| | | | |
|---|---|---|---|
| 3,518,221 | A | 6/1970 | Kenyon |
| 3,536,657 | A | 10/1970 | Noshay |
| 3,539,655 | A | 11/1970 | Strachan |

(Continued)

FOREIGN PATENT DOCUMENTS

| | | |
|---|---|---|
| EP | 1101810 A2 | 5/2001 |
| JP | 2006022168 A | 1/2006 |

(Continued)

*Primary Examiner* — Ling Siu Choi
*Assistant Examiner* — Ronald Grinsted
(74) *Attorney, Agent, or Firm* — Lowenstein Sandler LLP (57) ABSTRACT

A method for preparing a bonding component comprises mixing a first solution comprising an organofluorine monomer unit with a second solution comprising an organosilicon monomer unit to form, in-situ, a copolymer solution comprising a copolymer of an organofluorine polymer and an organosilicon polymer based on the organofluorine monomer unit and the organosilicon monomer unit. The method further comprises depositing the copolymer solution onto a body to form a film of the copolymer, and curing the film of the copolymer.

20 Claims, 4 Drawing Sheets

(51) Int. Cl.
    *C08L 83/04*     (2006.01)
    *C09J 127/12*     (2006.01)

(56) References Cited

U.S. PATENT DOCUMENTS

| | | | |
|---|---|---|---|
| 3,576,387 | A | 4/1971 | Derby |
| 4,370,358 | A | 1/1983 | Hayes et al. |
| 4,591,622 | A | 5/1986 | Blizzard et al. |
| 4,698,406 | A | 10/1987 | Lo et al. |
| 4,950,563 | A | 8/1990 | Stewart, Jr. et al. |
| 5,182,143 | A | 1/1993 | Holmes-Farley et al. |
| 5,720,703 | A | 2/1998 | Chen et al. |
| 5,813,870 | A | 9/1998 | Gaynes et al. |
| 5,830,565 | A | 11/1998 | Budnaitis |
| 5,870,271 | A | 2/1999 | Herchen |
| 5,886,535 | A | 3/1999 | Budnaitis |
| 5,936,829 | A | 8/1999 | Moslehi |
| 6,020,038 | A | 2/2000 | Chen et al. |
| 6,051,665 | A | 4/2000 | Yamada et al. |
| 6,271,326 | B1 | 8/2001 | Nishikawa et al. |
| 6,433,057 | B1 | 8/2002 | Bhagwagar et al. |
| 6,534,581 | B1 | 3/2003 | Kleyer et al. |
| 6,540,592 | B1 | 4/2003 | Schultz et al. |
| 6,637,198 | B2 | 10/2003 | Hertzberg |
| 6,642,304 | B1 | 11/2003 | Hansen et al. |
| 6,657,772 | B2 | 12/2003 | Loxley |
| 6,723,202 | B2 | 4/2004 | Nagaiwa et al. |
| 6,839,217 | B1 | 1/2005 | Larsen |
| 6,936,644 | B2 | 8/2005 | Gilleo |
| 7,045,014 | B2 | 5/2006 | Mahon et al. |
| 7,235,288 | B2 | 6/2007 | Kajander et al. |
| 7,329,464 | B2 | 2/2008 | Aoki |
| 7,476,446 | B2 | 1/2009 | Aoki |
| 7,622,367 | B1 | 11/2009 | Nuzzo et al. |
| 7,646,581 | B2 | 1/2010 | Sasaki et al. |
| 7,659,003 | B2 | 2/2010 | Aoki et al. |
| 7,672,110 | B2 | 3/2010 | Sun et al. |
| 7,940,512 | B2 | 5/2011 | Handa et al. |
| 8,057,909 | B2 | 11/2011 | Aoki et al. |
| 8,101,241 | B2 | 1/2012 | Benayoun et al. |
| 8,522,716 | B2 | 9/2013 | Kadkhodayan et al. |
| 8,622,021 | B2 | 1/2014 | Taylor et al. |
| 9,520,314 | B2 | 12/2016 | Sun et al. |
| 2003/0127496 | A1 | 7/2003 | Tetsuka et al. |
| 2004/0157064 | A1 | 8/2004 | Aoki |
| 2004/0160021 | A1 | 8/2004 | Tatsumi et al. |
| 2005/0042881 | A1 | 2/2005 | Nishimoto et al. |
| 2005/0075438 | A1 | 4/2005 | Andersson et al. |
| 2005/0090602 | A1 | 4/2005 | Koshikawa |
| 2005/0282977 | A1 | 12/2005 | Stempel et al. |
| 2006/0094834 | A1 | 5/2006 | Aoki et al. |
| 2006/0172140 | A1 | 8/2006 | Kuroda et al. |
| 2006/0175772 | A1 | 8/2006 | Nozawa |
| 2006/0189777 | A1 | 8/2006 | Aoki |
| 2007/0047170 | A1 | 3/2007 | Sun et al. |
| 2007/0217114 | A1 | 9/2007 | Sasaki et al. |
| 2008/0003439 | A1 | 1/2008 | Aoki |
| 2008/0029211 | A1 | 2/2008 | Sun et al. |
| 2008/0066676 | A1 | 3/2008 | Mariner et al. |
| 2008/0193741 | A1 | 8/2008 | Fujii et al. |
| 2008/0266746 | A1 | 10/2008 | Handa et al. |
| 2009/0250130 | A1 | 10/2009 | Studer et al. |
| 2010/0140222 | A1 | 6/2010 | Sun et al. |
| 2011/0083806 | A1 | 4/2011 | Noguchi et al. |
| 2011/0129676 | A1 | 6/2011 | Bravet et al. |
| 2014/0065835 | A1 | 3/2014 | Kadkhodayan et al. |
| 2017/0092525 | A1 | 3/2017 | Sun et al. |
| 2017/0152968 | A1 | 6/2017 | Raj et al. |

FOREIGN PATENT DOCUMENTS

| | | | |
|---|---|---|---|
| WO | 9600654 A1 | 1/1996 | |
| WO | WO-9600654 A1 * | 1/1996 | ........... C09D 127/18 |
| WO | 2008009803 A2 | 1/2008 | |

* cited by examiner

COPOLYMERIZED HIGH TEMPERATURE BONDING COMPONENT

RELATED APPLICATIONS

This patent application is a divisional application of U.S. patent application Ser. No. 15/352,925, filed Nov. 16, 2016, which claims the benefit under 35 U.S.C. § 119(e) of U.S. Provisional Application No. 62/255,939, filed Nov. 16, 2015, both of which are incorporated by reference herein.

TECHNICAL FIELD

Some embodiments of the present invention relate, in general, to a bonding component that is usable for binding dissimilar materials, while being plasma erosion resistant and maintaining its properties at high temperatures.

BACKGROUND

Bonding of showerhead (SH) and electrostatic chucks (ESCs) involves bonding of multiple dissimilar materials, e.g., ceramic and metal. These dissimilar materials have very different coefficients of thermal expansion (CTEs), making it challenging to bond the materials together. Additionally, upon exposure of the SH or ESCs to high stress at low and high temperatures, these parts delaminate.

The bonding material currently used to bond SH and ESCs is polydimethyl siloxane adhesive (PDMS). PDMS is a viscoelastic polymer which belongs to a group of polymeric organosilicon compounds also referred to as silicons. Its linear chemical structure is illustrated in Formula I below, Formula I wherein n represents the number of repeat monomer units. PDMS tends to form a three dimensional porous network by crosslinking the linear polymer chains of formula I. Despite its many advantages such as its compliant nature, PDMS cannot retain its adhesive properties at temperatures greater than 150° C. as it begins to delaminate.

Perfluoro elastomers are fluoro-carbon based polymers comprising strong carbon-fluorine bonds and are known for their durability and high resistance to oxygen plasma erosion as well as ability to withstand high temperatures greater than 250° C. These polymers are widely used to make O-rings and gaskets for applications involving high temperatures and corrosive fluids. However, independently perfluoro elastomers are not sufficiently compliant to adhere two dissimilar materials, as used in SH and ESCs applications.

Therefore, there remains a need in the art to prepare a bonding component having the compliant characteristics of PDMS along with the durability and high plasma erosion resistance of perfluoro elastomers at varying temperatures spanning from 120° C. to 300° C.

SUMMARY

Some embodiments of the present invention described herein cover a bonding component that includes a first amount of organofluorine polymer and a second amount of organosilicon polymer, wherein the organofluorine and the organosilicon polymers are chemically bound together.

Some embodiments of the present invention described herein cover a method for preparing a bonding component. The method includes mixing a first solution comprising organofluorine polymer with a second solution comprising organosilicon polymer to form, in-situ, a copolymer solution comprising a copolymer of the organofluorine polymer and the organosilicon polymer. The method further includes depositing the copolymer solution onto a body to form a film of the copolymer. The method further includes curing the film of the copolymer.

Some embodiments of the present invention described herein cover a method for preparing an adhesive. The method includes forming a solid three dimensional porous organosilicon polymer based network, said solid three dimensional porous organosilicon polymer based network having a surface. The method further includes contacting a solution comprising an organofluorine polymer with said surface, wherein the solution penetrates pores in the solid three dimensional porous organosilicon polymer based network. The method further includes crosslinking the organofluorine polymer with said organosilicon polymer to form a copolymer.

BRIEF DESCRIPTION OF THE DRAWINGS

So that the manner in which embodiments of the present invention can be understood in detail, a more particular description of embodiments, briefly summarized above, may be had by reference to the appended drawings. It is to be noted, however, that the appended drawings illustrate only some embodiments of this invention and are therefore not to be considered limiting of its scope, for the description may admit to other equally effective embodiments.

To facilitate understanding, identical reference numerals have been used, where possible, to designate identical elements that are common to the figures. It should be noted that different references to "an" or "one" embodiment in this disclosure are not necessarily to the same embodiment, and such references mean at least one.

DETAILED DESCRIPTION OF EMBODIMENTS

For the purpose of the present disclosure, the term "monomer unit" refers to a building block of a polymer or a copolymer, for example a building block of a copolymer of organosilicon and organofluorine may be an organosilicon polymer, an organofluorine polymer, or the monomers used to form an organosilicon polymer or an organofluorine polymer.

For purpose of the present disclosure, the term "substantially similar," when used in relation to the plasma erosion or temperature resistance of the bonding component, refers to a bonding component that is able to withstand plasma erosion levels within about 50% of the plasma erosion levels that the material it is compared to is able to withstand. For example, if the bonding component is compared to material A, and material A withstands X level of plasma for Y duration, a bonding component with substantially similar plasma erosion resistance to that of material A will withstand about X±50% level of plasma for about Y±50% duration.

For purpose of the present disclosure, the term "substantially similar," when used in relation to the mechanical properties of the bonding component, refers to a bonding component that has at least one of its mechanical properties (chosen from the group of: density, Young's modulus, poisson ratio, stiffness constants, tensile or fracture strength, specific heat, thermal conductivity, dielectric constant, index of refraction, electrical conductivity, and magnetic permeability) within about 50% of the comparable mechanical properties of the material it is compared to. For example, if the bonding component is compared to material B and material B has a Young's Modulus Z and a tensile strength W, the bonding component may have only a Young's Modulus of about Z±50%, or only a tensile strength of about W±50%, or a Young's Modulus of about Z±50% and a tensile strength of about W±50% to be substantially similar to B in relation to its mechanical properties.

For the purpose of the present disclosure, the term "dissimilar materials," refers to materials with different CTEs.

Embodiments of the present invention relate to a bonding component that will bind two or more dissimilar materials having different CTEs. Particularly, embodiments of the present invention provide a bonding component comprising a first amount of organofluorine polymer and a second amount of organosilicon polymer, wherein the organofluorine and the organosilicon polymers are chemically bound together. The bonding component is a copolymer that combines the high-temperature and plasma erosion resistance of the organofluorine polymer with the compliant nature of the organosilicon polymer to form a bonding component characterized by its enhanced thermal stability in corrosive environments.

One embodiment of the present invention provides a method for preparing a bonding component having the properties described hereinabove by mixing two polymer solutions, namely, an organosilicon polymer solution and an organofluorine polymer solution. By combining the two polymer solutions, a copolymer solution is formed that may subsequently be deposited as a film onto a first body comprising a material with a first CTE. A second body comprising a material with a second CTE may be pressed against the first body, and the film may be cured to join the second body to the first body.

Another embodiment of the present invention provides a method for preparing a bonding component having the properties described hereinabove by forming a solid three dimensional porous organosilicon polymer based network (hereinafter "organosilicon network"). The organosilicon network may then be contacted with an organofluorine polymer solution. The organofluorine polymer solution penetrates the pores of the organosilicon network and crosslinks with the organosilicon to form a copolymer.

Figure 1:
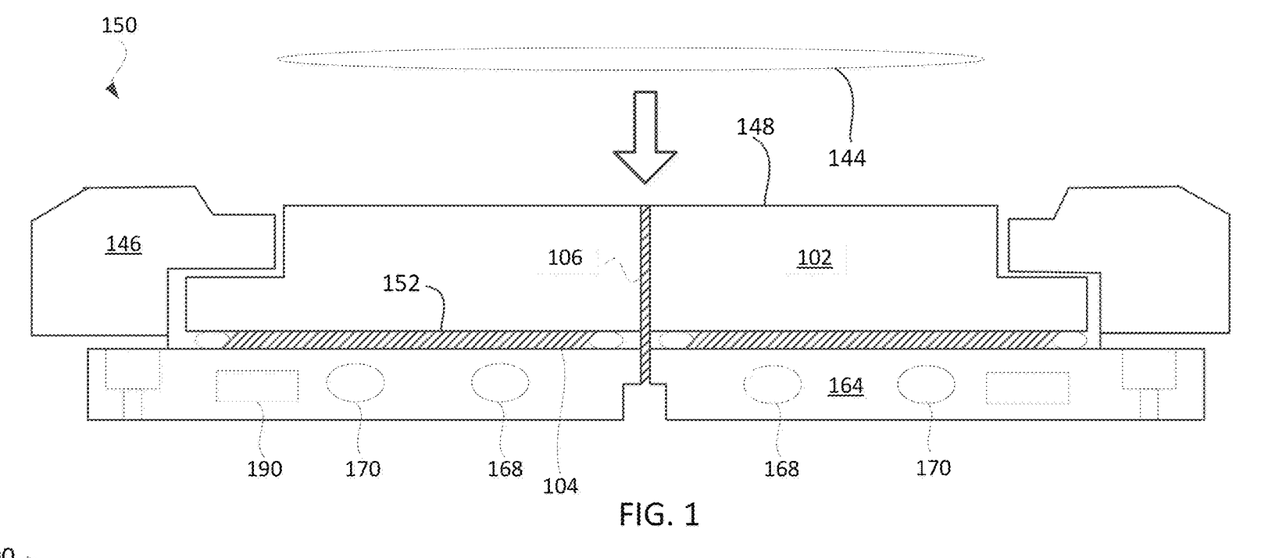
FIG. 1 depicts a cross-sectional view of an electrostatic chuck comprising a bonding component in accordance with an embodiment.
Figure 2:
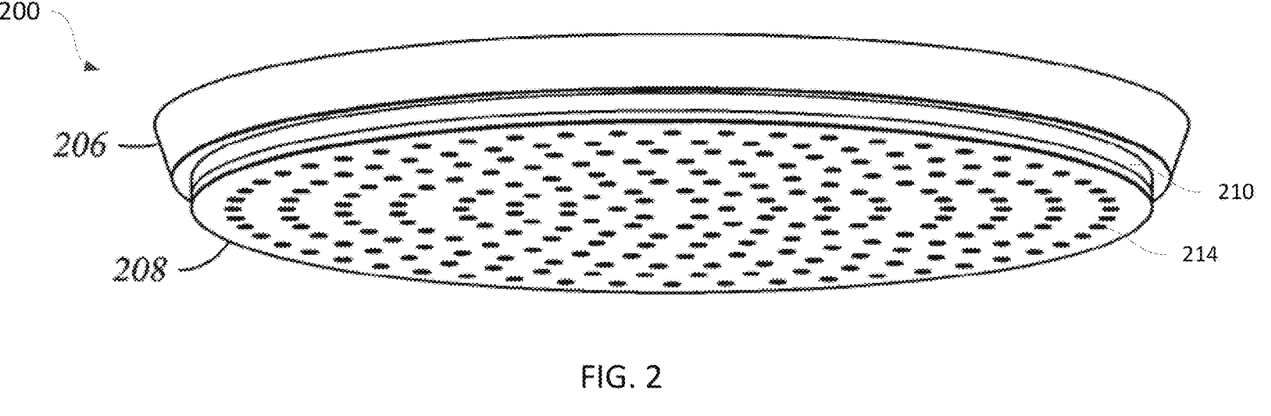
FIG. 2 depicts a showerhead illustrating a metal component bonded to a ceramic component with a bonding component according to an embodiment.

Embodiments of the present invention may be used in manufacturing any structures having two or more components joined by a bonding component. Particularly, embodiments of the present invention can be applied to any parts of a semiconductor processing chamber that uses a bonding material or a bonding component. For example, embodiments of the present invention may be used when bonding ceramic components to metal components to form electrostatic chucks (as illustrated in FIG. 1) and showerheads (as illustrated in FIG. 2) used in semiconductor processing chambers. Additionally, embodiments may be used to create copolymer O-rings and gaskets that are erosion resistant similar to a perfluoropolymer and that have elasticity similar to an organosilicon polymer.

FIG. 1 illustrates a cross sectional view of an electrostatic chuck 150. Electrostatic chuck 150 includes a thermally conductive base 164 coupled to a dielectric body 102 by a bonding component or adhesive 104, as will be discussed in greater detail below. In some embodiments, dielectric body 102 has a substantially disk shape with an upper contact surface 148 for supporting a substrate 144, and a bonding surface 152 for bonding to the conductive base 164 via bonding component 104. A quartz ring 146, or other protective ring, surrounds and covers portions of the electrostatic chuck 150. The substrate 144 is lowered down over the dielectric body 102, and is held in place via electrostatic forces, provided, in part due to electrode connection 106 (formed in the electrostatic chuck 150).

Electrode connection 106 is capable of receiving an electric charge to generate an electrostatic force to hold substrate 144 against contact surface 148 of the dielectric body 102. The electrode connection 106 may be made of any suitable metal such as aluminum, copper, chromium, molybdenum, tungsten, or combinations thereof.

The dielectric body 102 is formed from a dielectric material shaped and sized to provide suitable electrical characteristics for chucking substrate 144. Dielectric materials for the body 102 have good plasma erosion resistance and temperature resistance. The dielectric body 102 may be made from any suitable dielectric material. A non-limiting example of a suitable dielectric material for dielectric body 102 is a bulk sintered ceramic such as $Al_2O_3$ (aluminum oxide), $ZrO_3$, SiN, cubic BN, BC, TiO (titanium oxide), $Y_2O_3$ (yttria or yttrium oxide), $Y_4Al_2O_9$ (YAM), $Y_3Al_5O_{12}$ (YAG), $YAlO_3$ (YAP), Quartz, SiC (silicon carbide), $Si_3N_4$ (silicon nitride) Sialon, AlN (aluminum nitride), AlON (aluminum oxynitride), $TiO_2$ (titania), $ZrO_2$ (zirconia), TiC (titanium carbide), ZrC (zirconium carbide), TiN (titanium nitride), TiCN (titanium carbon nitride), $Y_2O_3$ stabilized $ZrO_2$ (YSZ), and so on.

Conductive base 164 is configured to provide physical support to the dielectric body 102. In some embodiments, Conductive base 164 is also configured to provide temperature control. Conductive base 164 may be made from a thermally conductive material, for example a metal such as aluminum or stainless steel. Conductive base 164 may comprise one or more heat exchangers, for example, an embedded heating element, fluid channels providing heat exchange by circulating cooling and heating fluids through the channels, or a combination thereof. In FIG. 1, conductive base 164 includes multiple fluid channels also referred to as conduits (e.g., an inner conduit 168 and an outer conduit 170) through which fluids may be flowed to heat or cool conductive base 164, electrostatic chuck 150, and the substrate 144 through thermal energy exchange between the conductive base and other components of the electrostatic chuck and the substrate. The temperature of conductive base 164 may be monitored using a temperature sensor 190.

Bonding component 104 mechanically bonds the thermally conductive base 164 to the dielectric body 102. The bonding component 104 can be any suitable adhesive bonding material. In some embodiments, bonding component 104 binds two or more dissimilar components, e.g., components with varying CTEs such as ceramic and metal. In some embodiments, bonding component 104 is resistant to temperatures up to about 300° C. In other embodiments, bonding component 104 is resistant to temperatures up to about 120° C. In yet other embodiments, bonding component 104 is resistant to variations in temperature ranging from temperatures of around 120° C. to temperatures as high as 300° C.

In some embodiments, bonding component 104 may be resistant to corrosive processing gases which it may be exposed to, including halogen-containing gas, such as $C_2F_6$, $SF_6$, $SiCl_4$, HBr, $NF_3$, $CF_4$, $CHF_3$, $CH_2F_3$, $C_{12}$ and $SiF_4$, among others, and other gases such as $O_2$, or $N_2O$.

In some embodiments, bonding component 104 comprises a first amount of an organofluorine polymer and a second amount of an organosilicon polymer, wherein the organofluorine polymer is chemically bound to the organosilicon polymer. In one embodiment, the organosilicon polymer comprises polydimethyl siloxane (PDMS) and the organofluorine polymer is selected from fluoropolymers, perfluoropolymers (FFKMs), or a combination thereof. Other examples of organosilicon polymers include but are not limited to PDMS, silyl ethers, silyl chlorides, silyl hydrides, and combinations thereof. Other examples of fluoropolymers include but are not limited to polyvinylfluoride (PVF), polyvinylidene fluoride (PVDF), tetrafluroethylene (TFE), chlorotrifluoroethylene (CTFE), and combinations thereof.

In some embodiments the organofluorine and organosilicon polymers may be chemically bound as copolymers. For instance, the copolymer may comprise from about 10 wt. % to about 90 wt. % organofluorine polymer and from about 10 wt. % to about 90 wt. % organosilicon polymer, based on total weight of the copolymer. In some embodiments, the resulting copolymer may be a block copolymer (e.g., a diblock copolymer or triblock copolymer), an alternating copolymer, a periodic copolymer, a statistical copolymer, a linear copolymer, a branched copolymer, combinations thereof, and any other copolymer arrangement.

In some embodiments, the first amount of organofluorine polymer is greater than the second amount of organosilicon polymer. For instance, the first amount of the organofluorine polymer may range from about 55 wt. %, about 60 wt. %, about 65 wt. %, about 70 wt. %, about 75 wt. % to about 80 wt. %, about 85 wt. %, about 90 wt. % or about 95 wt. %, and the second amount of the organosilicon polymer may range from about 5 wt. %, about 10 wt. %, about 15 wt. %, about 20 wt. %, about 25 wt. % to about 30 wt. %, about 35 wt. %, about 40 wt. % or about 45 wt. %. In some embodiments, the organofluorine polymer may be present in amounts ranging from about 60 wt. % to about 70 wt. %, from about 70 wt. % to about 80 wt. %, or from about 80 wt % to about 90 wt. %. In some embodiments, the organosilicon polymer may range from about 10 wt. % to about 20 wt. %, from about 20 wt. % to about 30 wt. %, or from about 30 wt. % to about 40 wt. %. All weight percentages are based on the total weight of the resulting copolymer.

In certain embodiments, the bonding component copolymer in the form of an adhesive. The adhesive may correspond to bonding component 104, and may have an elasticity that is substantially similar to the elasticity of the initial organosilicon polymer used to form the adhesive (e.g., PDMS). In other embodiments, the resulting copolymer may be used to form an o-ring or gasket that may be vulcanized to surfaces and act as a bonding component between the surfaces. In some embodiments, the resulting copolymer may be used to create an o-ring seal to be placed between two surfaces and compressed through mechanical fasteners.

The various bonding components described hereinabove will be characterized by a high plasma resistance characterized by slow erosion rate for extended duration and a compliant nature.

In some embodiments, the second amount of organosilicon polymer is greater than the first amount of organofluorine polymer. For instance, the second amount of the organosilicon polymer may range from about 55 wt. %, about 60 wt. %, about 65 wt. %, about 70 wt. %, about 75 wt. % to about 80 wt. %, about 85 wt. %, about 90 wt. % or about 95 wt. %, and the first amount of the organofluorine polymer may range from about 5 wt. %, about 10 wt. %, about 15 wt. %, about 20 wt. %, about 25 wt. % to about 30 wt. %, about 35 wt. %, about 40 wt. % or about 45 wt. %. In some embodiments, the organosilicon polymer may be present in amounts ranging from about 60 wt. % to about 70 wt. %, from about 70 wt. % to about 80 wt. %, or from about 80 wt % to about 90 wt. %. In some embodiments, the organofluorine polymer may range from about 10 wt. % to about 20 wt. %, from about 20 wt. % to about 30 wt. %, or from about 30 wt. % to about 40 wt. %. All weight percentages are based on the total weight of the resulting copolymer.

In certain embodiments the bonding component copolymer is in the form of an adhesive. In some embodiments, the resulting bonding component may comprise mechanical properties similar to those of the organosilicon polymer, such as: a thickness ranging from about 0.1 mm to about 0.3 mm, a thermal conductivity of about 0.15 W/mK, Young's modulus of about 52-130 psi, Poisson ratio of about 0.5, coefficient of thermal expansion of about $3.1 \cdot 10^{-4}$ $K^{-1}$, and density of about 0.97 kg/m³.

FIG. 2 depicts a showerhead 200 (also referred to as a gas distribution plate) illustrating a metal component 206 bonded to a ceramic component 208 with a bonding component 210 according to an embodiment. The showerhead 200 may be a showerhead for a plasma etch reactor. The showerhead 200 includes many (e.g., hundreds to thousands) of holes 214 through which gases are flowed. The showerhead 200 functions as an upper electrode that, together with a lower electrode in a plasma etch reactor, create an electric field that makes the gas become a plasma state and accelerates ions towards the surface of a substrate positioned below the showerhead 200.

The metal component 206 may be, for example, aluminum, an aluminum alloy, stainless steel, or another metal. The ceramic component 208 may be any of the dielectric materials described above with reference to ESC 150 of FIG. 1. The bonding component 210 may be a copolymer bonding component that includes an organofluorine polymer cross-linked with an organosilicon polymer. The bonding component 210 may correspond to any of the bonding components 104 described with reference to FIG. 1.

Figure 3:
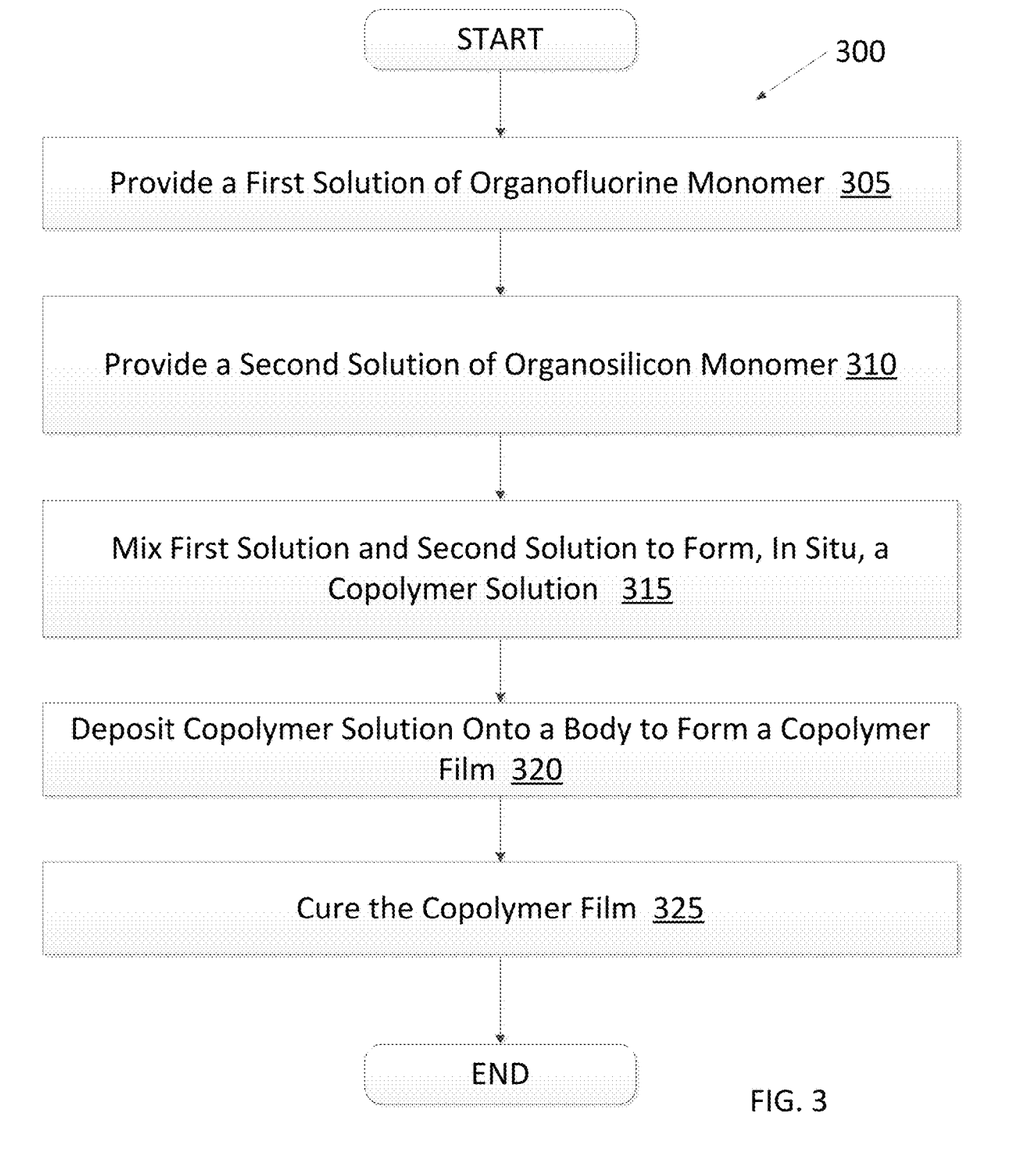
FIG. 3 depicts a flow chart illustrating a method for preparing a bonding component according to an embodiment.

FIG. 3 depicts a flow chart illustrating a method 300 for preparing a bonding component according to an embodiment. At block 305 of the method 300 a first solution of organofluorine monomer unit is provided. The organofluorine monomer unit may be a fluoropolymer, perfluoropolymer, or a combination thereof. The organofluorine monomer unit may additionally be a monomer used to prepare fluoropolymers or perfluoropolymers. Some nonlimiting examples of the organofluorine monomer units include: vinylidene fluoride, hexafluoropropylene, tetrafluoroethylene, perfluoromethylvinylether, and combinations thereof. The monomer unit in the organofluorine solution may have undergone some processing such as preliminary polymerization to form a fluoropolymer or a perfluoropolymer which may be subsequently used as a monomer unit in the instant copolymerization process. The fluoropolymer or perfluoropolymer that may be subsequently used in the copolymerization process may be, for example, polyvinylfluoride (PVF), polyvinylidene fluoride (PVDF), tetrafluroethylene (TFE), chlorotrifluoroethylene (CTFE), or combinations thereof.

At block 310 of method 300 a second solution of organosilicon monomer is provided. The organosilicon monomer may be PDMS, or a monomer used to prepare PDMS such as dimethyldichlorosilane. The monomer unit in the organosilicon solution may have undergone some processing such as preliminary polymerization to form an organosilicon polymer which may be subsequently used as a monomer unit in the copolymerization process. The monomer unit may be any unit used to prepare an organosilicon polymer such as PDMS, silyl ethers, silyl chlorides, silyl hydrides, and combinations thereof. The resulting organosilicon polymer may be subsequently used as a monomer unit in the copolymerization process.

At block 315 of method 300, the first solution of organofluorine monomer units and the second solution of organosilicon monomer units are mixed to form, in situ, a copolymer solution. Depending on the amount of organofluorine polymer and the amount of organosilicon polymer in the resulting copolymer, its mechanical properties may vary. In certain embodiments, a copolymer with more organofluorine polymer may result in a material with high temperature and plasma erosion resistance (similar to the plasma erosion resistance of the initial organofluorine polymer), but less elasticity than the initial organosilicon polymer, which is advantageous for forming an o-ring or gasket as will be further described below with respect to FIG. 4. An o-ring or gasket may be used as adhesive bonding component, wherein it may be vulcanized to the surfaces intended to be bound. Alternatively, the o-ring or gasket may be used as a seal compressed between two surfaces (e.g., that may be secured together with a mechanical fastener). In other embodiments, a copolymer with more organosilicon polymer may result in a material with similar mechanical properties to those of the initial organosilicon polymer used (such as PDMS), which is advantageous in the formation of a compliant adhesive that has a high elasticity.

At block 320 of method 300, the copolymer solution is deposited onto a first body to form a copolymer film. The copolymer solution may be deposited onto the first body by any of the following nonlimiting example methods including spin casting, drop casting, spray coating, dip coating, or doctor blade technique.

The copolymer solution may be in a liquid state, which is dispensed onto the first body, having a first CTE, and cured either before adhering a second body or after adhering the second body to the first body. The second body may have a second CTE and be made of a different material than the first body. For example, the first body may be a metal with a high CTE and the second body may be a ceramic with a low CTE. An example of a metal with a high CTE is aluminum with an average CTE of about $26.7 \cdot 10^{-6}$ per degree centigrade for a temperature changing from about 20° C. to about 400° C. An example of a ceramic with a low CTE is aluminum oxide ($Al_2O_3$) with an average CTE of about $1 \cdot 10^{-6}$ per degree centigrade for a temperature changing from about 25° C. to about 1000° C. The copolymer solution may also be printed onto a body by exemplary non-limiting methods such as 3D printing or screen printing. In some embodiments, the copolymer solution may be used to create a pre-formed sheet to be applied onto surfaces to be joined.

In some embodiments, the copolymer bonding component binds together bodies of dissimilar material. For example, one body may comprise ceramics of oxide nitride, and carbide based, including but not limited to $Al_2O_3$ (aluminum oxide), $ZrO_3$, SiN, cubic BN, BC, TiO (titanium oxide), $Y_2O_3$ (yttria or yttrium oxide), $Y_4Al_2O_9$ (YAM), $Y_3Al_5O_{12}$ (YAG), $YAlO_3$ (YAP), Quartz, SiC (silicon carbide) $Si_3N_4$ (silicon nitride) Sialon, AlN (aluminum nitride), AlON (aluminum oxynitride), $TiO_2$ (titania), $ZrO_2$ (zirconia), TiC (titanium carbide), ZrC (zirconium carbide), TiN (titanium nitride), TiCN (titanium carbon nitride) $Y_2O_3$ stabilized $ZrO_2$ (YSZ), and so on. The second body may comprise, for example, metals and alloys, including but not limited to stainless steel, aluminum (Al), magnesium (Mg), titanium (Ti), cobalt (Co), cobalt-nickel alloy (CoNi), nickel (Ni), chromium (Cr), gold (Au), silver (Ag) or various combinations thereof.

At block 325 of method 300, the copolymer film deposited onto the body's surface is cured. Curing can be performed by a variety of methods, for example, with temperature (thermal curing), with an ultra-violet light source (UV curing), with high pressure, with plasma, photo curing, or a combination thereof. Curing may be performed before the second body is adhered to the first body. Alternatively, curing may be performed after the two bodies are adhered with the copolymer bonding component.

Figure 4:
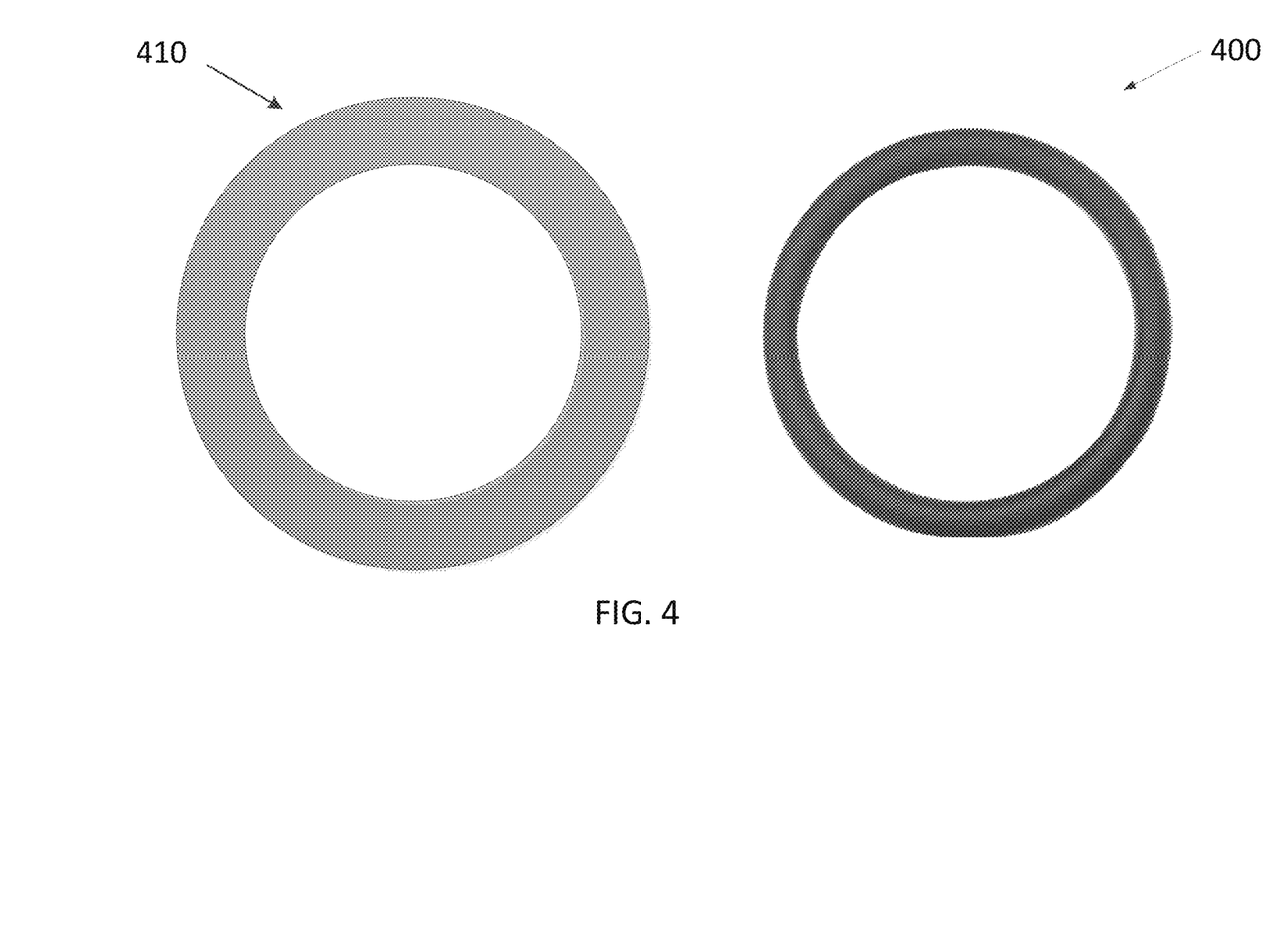
FIG. 4 depicts an o-ring and a gasket in accordance with an embodiment.

Embodiments are discussed herein with reference to bonding component that is used as an adhesive. Other embodiments are discussed with reference to formation o-rings and gaskets. FIG. 4 illustrates a gasket 410 and an o-ring 400 manufactured in accordance with embodiments described herein. To form the o-ring 400 or gasket 410, a copolymer solution may be prepared as set forth in method 300. The copolymer solution may then be poured into or injected into a mold having a particular shape of a gasket or o-ring. Alternatively, a sheet of copolymer may be produced and then cut (e.g., stamped) to form gaskets and/or o-rings therefrom. The o-ring 400 or gasket 410 may be vulcanized to a body. Exemplary bodies include a cooling plate of an electrostatic chuck as depicted in FIG. 1 by numeral 164, or a shower head as depicted in FIG. 2. If a body, such as a conductive base or a shower head, has cutouts, the o-ring and the gasket may have cutout with similar features to ensure a tight seal.

In one embodiment, the o-ring 400 is a copolymer of an organofluorine and an organosilicon polymer, wherein the amount of organofluorine polymer is greater than the amount of organosilicon polymer. O-ring 400 may have resistance to temperatures ranging from 120° C. to 300° C. and to plasma erosion due to advantageous properties inherited from the organofluorine polymer.

The o-ring 400 may be a stepped o-ring having a first step at a first thickness and a second step at a second thickness. This may facilitate uniform tightening of fasteners (not shown in FIG. 4) by causing the amount of force used to tighten the fasteners to increase dramatically after a set amount of compression of o-ring 400. O-ring 400 or gasket 410 may provide a vacuum seal between bodies adhered together. The o-ring may be replaceable. When the o-ring 400 degrades it may be removed and a new o-ring may be used.

Figure 5:
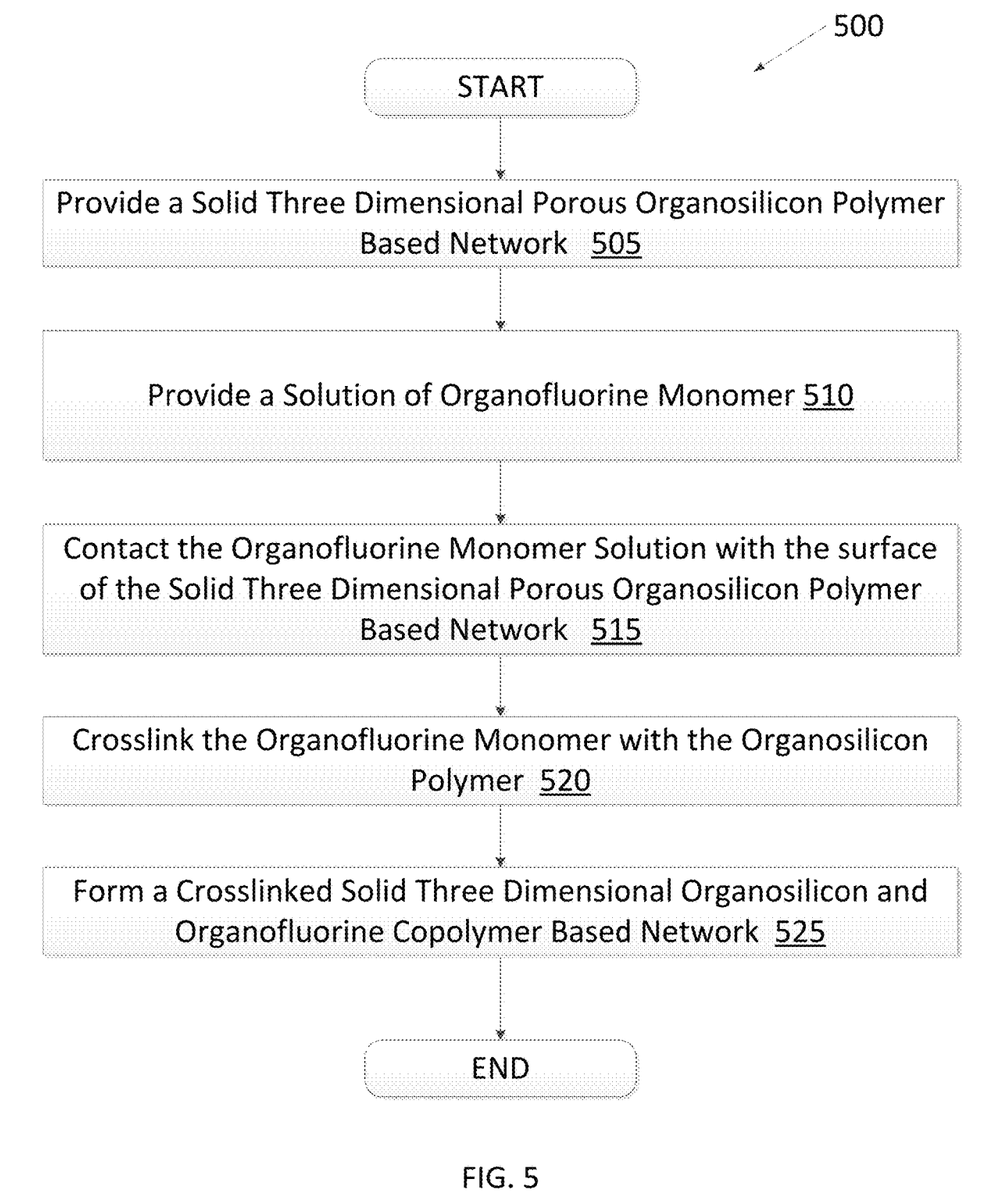
FIG. 5 depicts a flow chart illustrating a method for preparing an adhesive according to an embodiment.

FIG. 5 depicts a flow chart illustrating a method 500 for preparing an adhesive according to another embodiment. In block 505, a solid three dimensional porous organosilicon polymer based network (hereinafter "organosilicon network") is provided. Alternatively, the organosilicon network may be formed by depositing a solution of an organosilicon polymer onto a body and curing the organosilicon polymer. For example, the organosilicon network may undergo processing such as polymerization and cross linking of a monomer used to form the organosilicon polymer, for example polymerization and cross linking of dimethyldichlorosilane to form a network of PDMS.

In block 510, an organofluorine monomer unit solution is provided. The organofluorine monomer unit may be a fluoropolymer, perfluoropolymer, or a combination thereof. The organofluorine monomer may also be a monomer used to prepare fluoropolymers or perfluoropolymers. Some non-limiting examples of the organofluorine monomer include: vinylidene fluoride, hexafluoropropylene, tetrafluoroethylene, perfluoromethylvinylether, and combinations thereof. The monomer unit in the organofluorine solution may have undergone some processing such as preliminary polymerization to form a fluoropolymer or a perfluoropolymer which may be subsequently used as a monomer unit in the copolymerization process. The fluoropolymer or perfluoropolymer that may be subsequently used in the copolymerization process may be, for example, polyvinylfluoride (PVF), polyvinylidene fluoride (PVDF), tetrafluroethylene (TFE), chlorotrifluoroethylene (CTFE), or combinations thereof.

In block 515, the organofluorine monomer unit solution is contacted with the solid organosilicon network, wherein the organofluorine monomer solution penetrates the pores of the organosilicon network. This can be done by submerging the organosilicon network into the monomer solution, by spraying the monomer solution onto the organosilicon network, or by any other similar method known in the art.

In block 520, the organofluorine monomer solution cross-links with the organosilicon network. The cross linking may occur inside the pores of the organosilicon network and outside of its pores. In block 525, a crosslinked solid three dimensional organosilicon and organofluorine copolymer based network is formed.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. In one embodiment, multiple metal bonding operations are performed as a single step.

It is to be understood that the above description is intended to be illustrative, and not restrictive. Many other embodiments will be apparent to those of skill in the art upon reading and understanding the above description. The scope herein should, therefore, be determined with reference to the appended claims, along with the full scope of equivalents to which such claims are entitled.

What is claimed is:

1. A method for preparing a bonding component comprising:
   mixing a first solution comprising an organofluorine monomer unit with a second solution comprising an organosilicon monomer unit to form, in-situ, a copolymer solution comprising a copolymer of an organofluorine polymer and an organosilicon polymer based on the organofluorine monomer unit and the organosilicon monomer unit;
   depositing the copolymer solution onto a body to form a film of the copolymer; and
   curing the film of the copolymer.

2. The method of claim 1, wherein depositing the copolymer solution onto the body comprises performing one of a spin casting, drop casting, spray coating, dip coating or doctor blade technique.

3. The method of claim 1, wherein curing the film of the copolymer comprises using one of temperature, UV light source, high pressure, plasma, or a combination thereof.

4. The method of claim 1, wherein the bonding component binds dissimilar materials and is resistant to temperatures up to about 300° C.

5. The method of claim 1, wherein the organofluorine polymer is selected from the group consisting of a fluoropolymer, a perfluoropolymer, and combinations thereof.

6. The method of claim 1, wherein the organosilicon polymer comprises polydimethyl siloxane.

7. The method of claim 1, wherein the organofluorine polymer and the organosilicon polymer are chemically bound as a block copolymer in the film of the copolymer.

8. The method of claim 1, further comprising:
   bonding a ceramic material to a metal material by the film of the copolymer.

9. The method of claim 1, wherein a first amount of the organofluorine polymer is greater than a second amount of the organosilicon polymer in the copolymer.

10. The method of claim 9, wherein the film of the copolymer has a plasma erosion resistance that is substantially similar to a plasma erosion resistance of the organofluorine polymer.

11. The method of claim 1, wherein a second amount of the organosilicon polymer is greater than a first amount of the organofluorine polymer in the copolymer.

12. The method of claim 11, wherein the film of the copolymer has a first mechanical property that is substantially similar to a second mechanical property of an unbound organosilicon polymer, wherein the first mechanical property and the second mechanical property comprise at least one of the following: density, Young's modulus, Poisson ratio, stiffness constant, tensile or fracture strength, specific heat, thermal conductivity, or magnetic permeability.

13. The method of claim 1, wherein the copolymer comprises an alternating copolymer or a periodic copolymer of the organofluorine polymer and the organosilicon polymer.

14. The method of claim 1, wherein the copolymer comprises a statistical copolymer or a branched copolymer of the organofluorine polymer and the organosilicon polymer.

15. The method of claim 1, wherein the copolymer comprises a linear copolymer of the organofluorine polymer and the organosilicon polymer.

16. The method of claim 1, wherein the organofluorine polymer and the organosilicon polymer are crosslinked in the film of the copolymer.

17. A method for preparing an adhesive comprising:
   forming a solid three dimensional porous organosilicon polymer based network, said solid three dimensional porous organosilicon polymer based network having a surface;
   contacting a solution comprising an organofluorine monomer unit with said surface, wherein the solution penetrates pores in the solid three dimensional porous organosilicon polymer based network; and
   crosslinking the organofluorine monomer unit with said solid three dimensional porous organosilicon polymer based network to form a copolymer.

18. The method of claim 17, wherein the copolymer comprises a first amount of organofluorine polymer and a second amount of organosilicon polymer,
   wherein the second amount is greater than the first amount,
   wherein the organofluorine polymer is selected from the group consisting of a fluoropolymer, a perfluoropolymer, and combinations thereof, and
   wherein the organosilicon polymer comprises polydimethyl siloxane.

19. The method of claim 17, wherein the adhesive binds dissimilar materials.

20. The method of claim 17, wherein the adhesive is resistant to temperatures up to about 300° C.

* * * * *